(12) United States Patent
Shibukawa

(10) Patent No.: US 11,867,671 B2
(45) Date of Patent: Jan. 9, 2024

(54) METHOD FOR AMINO ACID ANALYSIS AND SYSTEM FOR AMINO ACID ANALYSIS

(71) Applicants: National University Corporation Saitama University, Saitama (JP); Hitachi High-Tech Science Corporation, Tokyo (JP)

(72) Inventor: Masami Shibukawa, Saitama (JP)

(73) Assignees: NATIONAL UNIVERSITY CORPORATION SAITAMA UNIVERSITY, Saitama (JP); HITACHI HIGH-TECH SCIENCE CORPORATION, Tokyo (JP)

(*) Notice: Subject to any disclaimer, the term of this patent is extended or adjusted under 35 U.S.C. 154(b) by 735 days.

(21) Appl. No.: 16/721,185

(22) Filed: Dec. 19, 2019

(65) Prior Publication Data

US 2020/0217826 A1    Jul. 9, 2020

(30) Foreign Application Priority Data

Dec. 26, 2018  (JP) ................................. 2018-241936

(51) Int. Cl.
*G01N 30/54* (2006.01)
*G01N 30/52* (2006.01)

(52) U.S. Cl.
CPC ....... *G01N 30/54* (2013.01); *G01N 2030/522* (2013.01)

(58) Field of Classification Search
CPC ........ B01D 15/362; B01D 2252/20494; G01N 2030/3076; G01N 2030/522;

(Continued)

(56) References Cited

U.S. PATENT DOCUMENTS

2013/0145828 A1* 6/2013 Kawarai ............. B01J 20/3293
73/61.53

FOREIGN PATENT DOCUMENTS

FR    2939198 A1 *  6/2010  ......... G01N 33/5088
JP    60224062 A  * 11/1985  ............. G01N 30/88

(Continued)

OTHER PUBLICATIONS

Inomata, Retention Behavior or Amino Acids in Superheated Water Ion Exchange Chromatography, 2013 (Year: 2013).*

(Continued)

*Primary Examiner* — John Fitzgerald
*Assistant Examiner* — Truong D Phan
(74) *Attorney, Agent, or Firm* — Hamre, Schumann, Mueller & Larson, P.C.

(57) ABSTRACT

The present invention provides a highly versatile method for amino acid analysis, the method enabling separation and analysis of amino acids in a sample with high precision in a shorter time. This method is a method for amino acid analysis, the method including a step of allowing a sample containing a plurality of amino acids to flow together with an eluent 2 through a separation column 4 packed with a cation exchange resin, thereby separating the amino acids, and a step of detecting the separated amino acids, wherein the eluent 2 is an eluent containing a divalent or higher inorganic acid, a cation source, and water, and having a pH of 5.0 or lower, and the sample is allowed to flow through the separation column 4 heated by applying a temperature gradient including a temperature region of 100° C. or higher.

6 Claims, 3 Drawing Sheets

(58) Field of Classification Search
CPC ........... G01N 2030/8818; G01N 30/54; G01N 30/96; G01N 33/68; G01N 33/6803; G01N 33/6806; G01N 33/6809; G01N 33/6812; G01N 2333/90644; G01N 33/6848; G01N 33/6851; G01N 2650/00; G01N 2800/7076

See application file for complete search history.

(56) References Cited

FOREIGN PATENT DOCUMENTS

| JP | 2002-243715 | 8/2002 | | |
|---|---|---|---|---|
| JP | 2014-142258 | 8/2014 | | |
| JP | 2015-215174 | 12/2015 | | |
| WO | WO-2009003952 A2 * | 1/2009 | ............ | B01J 20/286 |

OTHER PUBLICATIONS

Japanese Office Action, issued in the corresponding Japanese patent application 2018-241936, dated Apr. 16, 2019, 5 pages (including machine translation).

Inomata et al., "Retention Behavior of Amino Acids in Superheated Water Ion Exchange Chromatography", Abstract of Lecture from 73th Analytical Chemistry Symposium, The Japan Society for Analytical Chemistry, May 18-19, 2013, 6 pages (including partial English translation).

Hagiwara, "Temperature Effect on Ion Exchange Equilibrium of Amino Acids in Cation Exchange Resin", Master's Thesis Presentation, Graduate School of Science and Engineering, Saitama University, Feb. 14-15, 2018, 6 pages (including partial English translation).

Hagiwara et al., "Temperature Effects on Cation Exchange Equilibrium of Amino Acids, Separation of Amino Acids by Temperature Gradient Superheated Water Ion Exchange Chromatography", Abstracts of Lectures from 78th Analytical Chemistry Symposium, May 26-27, 2018, 8 pages (including partial English translation).

Shibukawa et al., "Separate 15 Kinds of Amino Acids with One Eluent", Nikkan Kogyo Shimbun, May 24, 2018, 2 pages (newspaper article, including partial English translation).

Shibukawa et al., "Amino Acid Separation Halved Time", Nikkei Sangyo Shimbun, Jul. 4, 2018, 2 pages (newspaper article, including partial English translation).

"Amino Acids", Vanderbilt University, 1 page, downloaded from https://www.vanderbilt.edu/AnS/Chemistry/Rizzo/Chem220b/aminoacids.pdf, on Aug. 1, 2023.

"Ion Exchange Chromatography, Principles and Methods", GE Healthcare, excerpt of Chapter 1, 18 pages, Jan. 2016.

"Amio Acids", Vanderbilt University, 2 pages, downloaded from https://www.vanderbilt.edu/AnS/Chemistry/Rizzo/stuff/AA/AminoAcids.html, on Aug. 4, 2023.

Yokoyama et al., "Polyfunctional low-capacity cation-exchange packing material for the separation of underivatized amino acids", Talanta, 103, 2013, pp. 245-251, 7 pages.

* cited by examiner

[FIG.1]
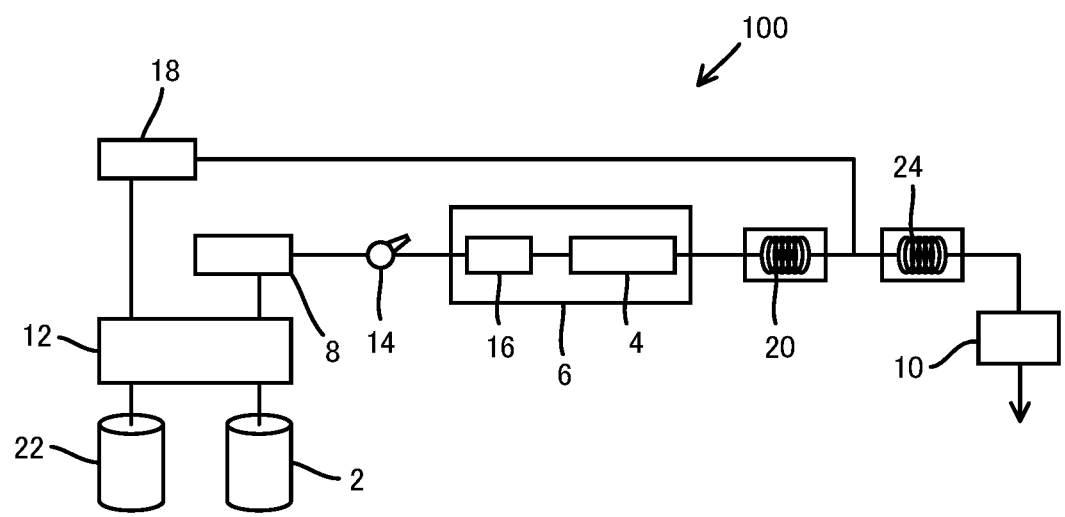

[FIG. 2]
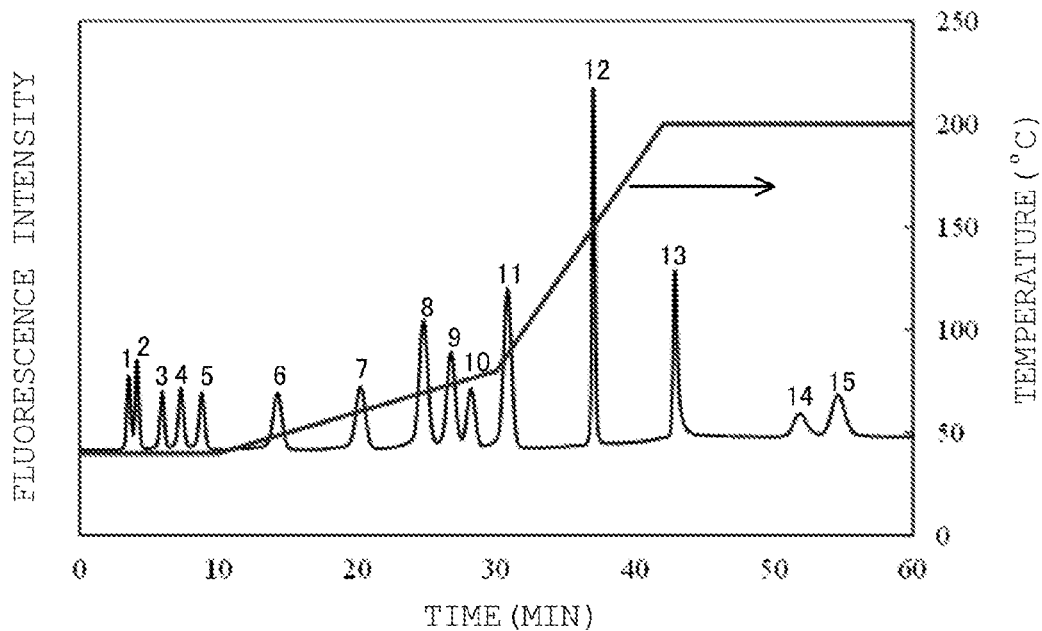
[FIG. 3]
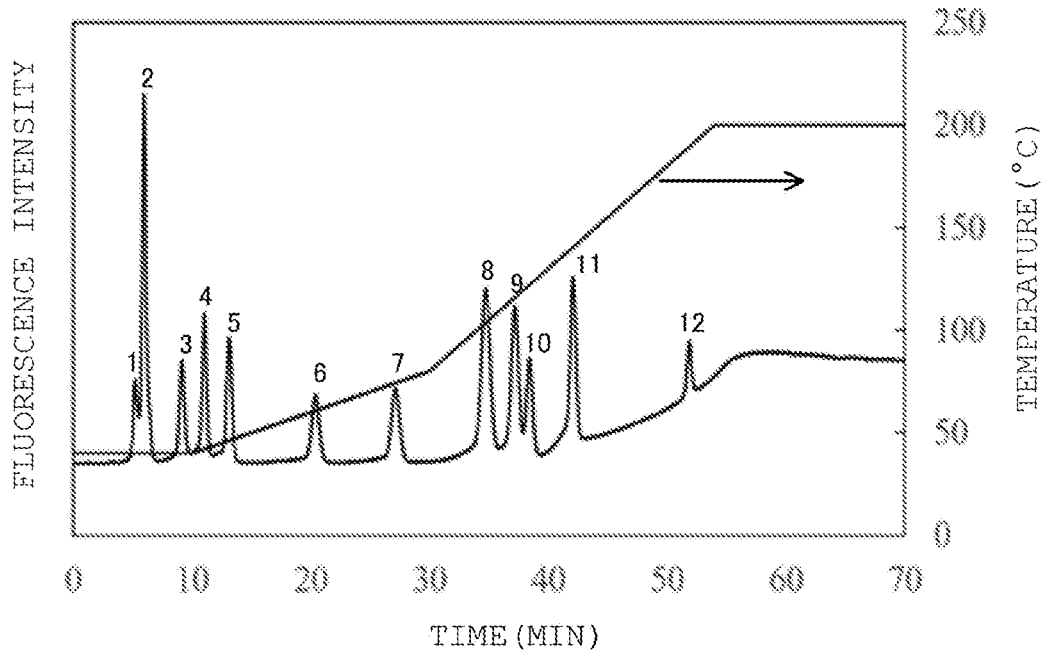

[FIG. 4]
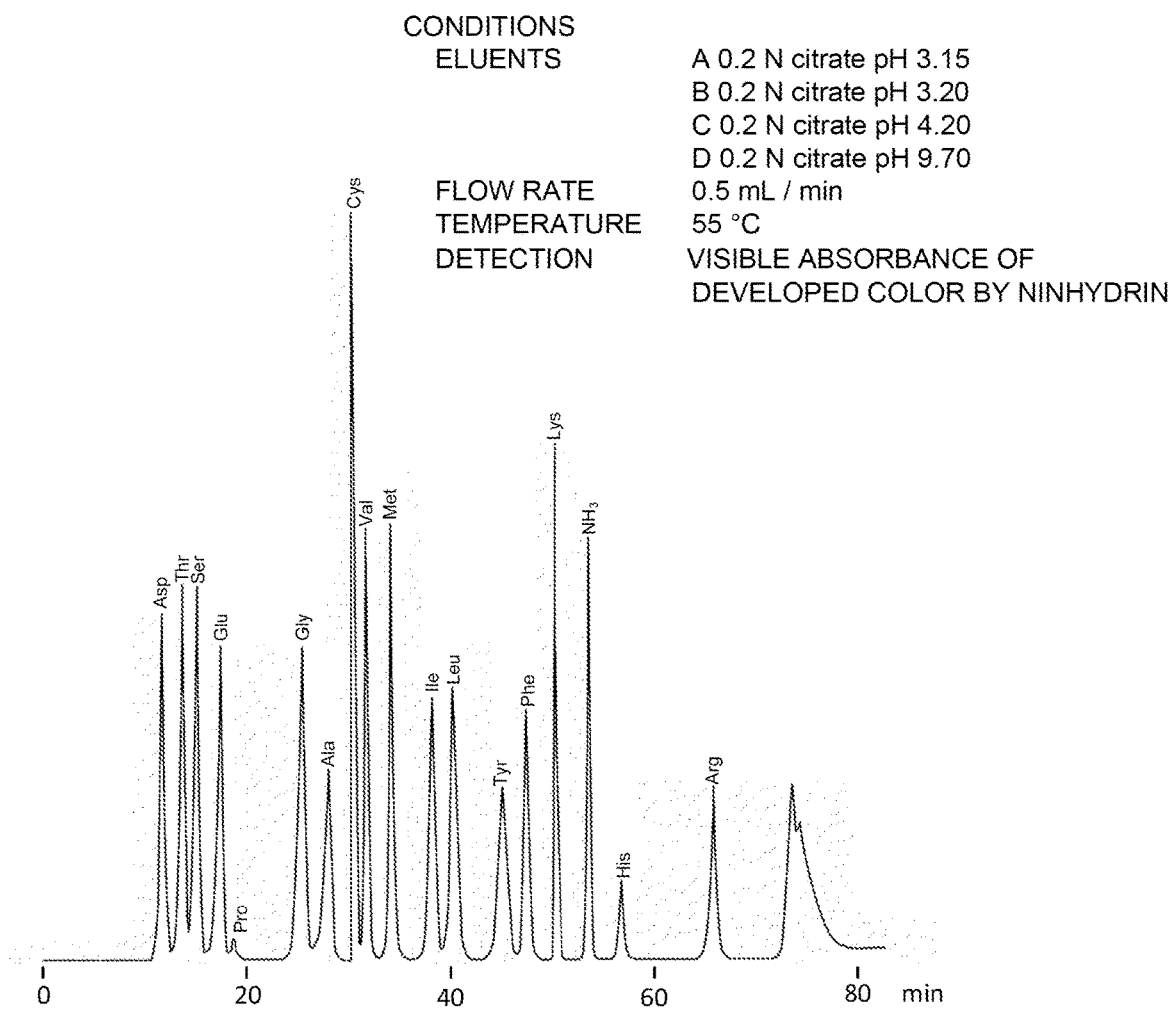

METHOD FOR AMINO ACID ANALYSIS AND SYSTEM FOR AMINO ACID ANALYSIS

BACKGROUND OF THE INVENTION

Field of the Invention

The present invention relates to a method for amino acid analysis, and a system for amino acid analysis, which is used in the method for amino acid analysis.

Description of the Related Arts

A method for amino acid analysis is important as a method for determining a primary structure of protein. The application field of the method for amino acid analysis, such as diagnosis of diseases through the analysis of free amino acids in blood or urine, or analysis of amino acid compositions in the development of new foods and pharmaceuticals, has been expanding in these years.

Ion exchange chromatography is a method for separating and analyzing amino acids efficiently. In the ion exchange chromatography, the elution times of amino acids change by changing the type of ion exchange resin to be packed in a separation column. Therefore, improvements in precision and speed of analysis have been achieved by controlling the molecular structures and exchange capacities of ion exchange resins. For example, there is proposed a packing for liquid chromatography having particular functional groups including sulfo group and exchange capacities controlled in a programmed range, and an analysis method using a packing for liquid chromatography (Japanese Patent Laid-Open No. 2015-215174).

In addition, in the ion exchange chromatography, the elution times of amino acids change by changing separation parameters, such as the flow rate of the eluent (buffer solution, mobile phase), the temperature of the separation column, and the composition of the eluent. An influence of a change in the separation parameters on the elution time is different depending on amino acid, and therefore improvements in the precision and speed of analysis have been achieved by appropriately setting the separation parameters. For example, there is proposed for amino acid analysis, the apparatus using a separation column packed with a fine ion exchange resin and having a ratio of a length (L) to an inner diameter (R) (L/R) in a particular range, and a method using the apparatus (Japanese Patent Laid-Open No. 2002-243715). Further, there is proposed a method for analyzing amino acids with high speed and high precision by controlling pH of a buffer solution and the temperature of a separation column (Japanese Patent Laid-Open No. 2014-142258).

However, in the analysis methods proposed in Japanese Patent Laid-Open No. 2015-215174, Japanese Patent Laid-Open No. 2002-243715, and Japanese Patent Laid-Open No. 2014-142258, a plurality of eluents need to be prepared and used, and therefore the analysis apparatus itself is likely to be large and complicated. In addition, the analysis needs to be performed while strictly controlling switches, temperatures, and the like of a plurality of prepared eluents, therefore, it cannot necessarily be said that those analysis methods are simple methods, and besides, considerable time has been required for completing the analysis in some cases depending on the number or types of amino acids in a sample. Further, a time for equilibrating the column with the first eluent is needed before starting the next analysis after one analysis is completed, and therefore a problem that the number of measurements within a certain time is small has existed fundamentally.

The present invention has been completed in view of such problems of the conventional techniques, and an object of the present invention is to provide a highly versatile method for amino acid analysis, the method enabling separation and analysis of amino acids in a sample with high precision in a shorter time. Another object of the present invention is to provide a system for amino acid analysis, which is used in the method for amino acid analysis.

SUMMARY OF THE INVENTION

That is, according to the present invention, a method for amino acid analysis, described below, is provided.

[1] A method for amino acid analysis, the method comprising: a step of allowing a sample containing a plurality of amino acids including a basic amino acid to flow together with an eluent through a separation column packed with a cation exchange resin, thereby separating the amino acids; and a step of detecting the separated amino acids, wherein: the eluent is an eluent containing a polybasic acid, a cation source, and water, and having a pH of 5.0 or lower; the cation source is an alkali metal salt, and an alkali metal constituting the alkali metal salt is at least any one of lithium (Li) and Na (sodium); and the sample is allowed to flow through the separation column heated by applying a temperature gradient including a temperature region of 100° C. or higher.

[2] The method for amino acid analysis according to [1], wherein the polybasic acid is at least one selected from the group consisting of sulfuric acid, selenic acid, phosphoric acid, diphosphoric acid, citric acid, sulfosalicylic acid, and fluorophthalic acid.

[3] The method for amino acid analysis according to [1] or [2], wherein a highest temperature in the temperature gradient is 210° C.

[4] The method for amino acid analysis according to any one of [1] to [3], wherein the cation exchange resin is a strongly acidic cation exchange resin having a sulfo group.

Further, according to the present invention, a system for amino acid analysis, described below, is provided.

[5] A system for amino acid analysis, the system comprising: an eluent containing a polybasic acid, a cation source, and water, and having a pH of 5.0 or lower; a separation column packed with a cation exchange resin; a heating mechanism that heats the separation column by applying a temperature gradient including a temperature region of 100° C. or higher; a pressurizing mechanism that allows a sample containing a plurality of amino acids including a basic amino acid to flow together with the eluent through the separation column; and a detection unit that detects the amino acids separated by the separation column, wherein the cation source is an alkali metal salt, and an alkali metal constituting the alkali metal salt is at least any one of lithium (Li) and sodium (Na).

According to the present invention, a highly versatile method for amino acid analysis, the method enabling separation and analysis of amino acids in a sample with high precision in a shorter time, can be provided. Further, according to the present invention, a system for amino acid analysis, which is used in the method for amino acid analysis, can be provided.

BRIEF DESCRIPTION OF THE DRAWINGS

FIG. 1 is a schematic diagram showing one embodiment of a system for amino acid analysis of the present invention;

FIG. 2 is a chromatogram showing a result of amino acid analysis in Example 1;

FIG. 3 is a chromatogram showing a result of amino acid analysis in Comparative Example 1; and FIG. 4 is a chromatogram showing a result of amino acid analysis in Reference Example 1.

DETAILED DESCRIPTION OF THE PREFERRED EMBODIMENTS

Method for Amino Acid Analysis

Hereinafter, embodiments of the present invention will be described, but the present invention is not limited to the following embodiments. The "amino acids" in the present specification include 20 types of amino acids that constitute proteins, and other amino acids, such as hydroxyproline (HyPro), methionine sulfone (MetSON), Hydroxylysine (HyLys), ornithine (Orn), Norvaline (Norval), cysteic acid ($CysO_3H$), and citrulline (Cit).

The present inventors have investigated temperature dependence (including superheated temperature region of 100° C. or higher) of acid dissociation constants of carboxy groups of the amino acids and of selectivity coefficients of ion exchange in cation exchange chromatography of the amino acids. As a result, it has been clarified that the acid dissociation constants of the carboxy groups of the amino acids decrease as the temperature increases and decrease remarkably in superheated temperature region. It is inferred that this is because the dielectric constant of water is lowered as the temperature increases, so that the dissociation of the carboxy groups is suppressed. In addition, it has been clarified that the selectivity coefficients of ion exchange of the amino acids decrease as the temperature increases, and the selectivity coefficients of ion exchange of all the amino acids take almost the same value in the superheated temperature region (for example, around 150° C.). It is inferred that this is because the dielectric constant of water is lowered as the temperature increases, so that the hydrophobic interaction decreases. Further, it has been clarified that the selectivity coefficient of ion exchange under a high temperature condition and the selectivity coefficient of ion exchange under normal temperature condition are reversed in some amino acids. It is inferred that this is because the size of the amino acids affects the ion exchange due to the decrease in the hydrophobic interaction.

Based on the above results, the present inventors have found that cation exchange chromatography utilizing high-temperature and high-pressure water (superheated water) of 100° C. or higher enables separation and analysis of the amino acids with high precision in a shorter time and thereby completed the present invention. That is, the method for amino acid analysis of the present invention includes: a step (separation step) of allowing a sample containing a plurality of amino acids to flow together with an eluent through a separation column packed with a cation exchange resin, thereby separating the amino acids; and a step (detection step) of detecting the separated amino acids. The eluent to be used is an eluent containing a polybasic acid, a cation source, and water, and having a pH of 5.0 or lower. The sample is allowed to flow through the separation column heated by applying a temperature gradient including a temperature region of 100° C. or higher. Hereinafter, the details on the method for amino acid analysis of the present invention will be described.

Separation Step

In the separation step, a sample containing a plurality of amino acids is allowed to flow together with an eluent through a separation column packed with a cation exchange resin, thereby separating the amino acids. In addition, the sample is allowed to flow through the separation column heated by applying a temperature gradient including a temperature region of 100° C. or higher. Thereby, the amino acids in the sample can be separated with high precision.

The temperature gradient may include a temperature region of 100° C. or higher, preferably includes a temperature region of 120° C. or higher, and still more preferably includes a temperature region of 150° C. or higher. Specific examples of the temperature gradient include a range from room temperature (25° C.) or a temperature near room temperature (around 40° C.) to 210° C., and is preferably a range from around 40° C. to 200° C. The temperature increase rate may be made constant or does not have to be made constant. The temperature increase rate can appropriately be set according to the sample intended to be analyzed. Further, the temperature may be increased in a step-wise manner.

To heat the separation column to a temperature of 100° C. or higher, pressurization is usually conducted for the purpose of avoiding vaporization (boiling) of an eluent. The eluent may be allowed to flow through the separation column in a state of being pressurized to, for example, about 2 to about 30 MPa, preferably about 2 to 20 MPa, and still more preferably about 2 to 10 MPa. For example, the eluent which is allowed to flow through the separation column can be pressurized by disposing a backpressure coil or the like on the downstream side of the separation column.

Separation Column

The separation column is packed with a cation exchange resin. The size of the separation column can appropriately be set according to the type, amount, and the like of the sample to be an object of analysis. In the method for amino acid analysis of the present invention, the amino acids can be separated and analyzed with a higher column efficiency than in a conventional method for amino acid analysis utilizing cation exchange chromatography, and therefore a separation column having a smaller size can be used.

As the cation exchange resin with which the separation column is packed, cation exchange resins for use in the conventional cation exchange chromatography can be used. Among others, it is preferable to use a strongly acidic cation exchange resin having a sulfo group ($-SO_3H$). However, the cation exchange resin is heated to a temperature region of 100° C. or higher, and therefore it is preferable to use a cation exchange resin having heat resistance such that the cation exchange resin does not substantially undergo decomposition or the like even if the cation exchange resin is heated to a temperature region of 100° C. or higher. Examples of such a cation exchange resin include a resin obtained by introducing a sulfo group in a styrene-divinylbenzene copolymer (PSDVB). The heat resistance of the resin such as PSDVB can be controlled by, for example, appropriately designing the degree of crosslinking. Examples of commercially available products of the cation exchange resin include trade name "MCI GEL CK10S" (manufactured by Mitsubishi Chemical Corporation, degree of crosslinking: 10%, exchange capacity: 2.0 meq/mL, particle diameter: 11 µm) and trade name "MCI GEL CK10U" (manufactured by Mitsubishi Chemical Corporation, degree of crosslinking: 10%, exchange capacity: 2.0 meq/mL, particle diameter: 5 µm).

Eluent

The eluent to be used as a mobile phase is an aqueous eluent (aqueous solution) containing a polybasic acid, a cation source, and water. By allowing a sample to flow together with such an eluent containing a polybasic acid and a cation source through the separation column heated by applying a temperature gradient including a temperature region of 100° C. or higher, the amino acids in the sample can be separated with high precision in a shorter time.

It is difficult to separate a plurality of amino acids with high precision in a short time if a monobasic acid, such as hydrochloric acid (HCl), is used in place of the polybasic acid, and for example, even if the temperature is raised to 200° C., basic amino acids, such as lysine (Lys) and arginine (Arg), cannot be eluted from the separation column. In contrast, the above-described basic amino acids can be separated and eluted from the separation column by using the eluent containing a polybasic acid.

The second acid dissociation constant of sulfuric acid ($H_2SO_4$) (Ka; $HSO_4^- \rightarrow H^+ + SO_4^{2-}$) is such that pKa=2.0 at 25° C. and pKa=4.3 at 200° C., and decreases remarkably as the temperature increases. Due to this, the pH of a sulfuric acid aqueous solution, which is 3.0 at normal temperature (25° C.), rises up to 5.0 at 200° C. That is, when an aqueous solution containing a polybasic acid is used as an eluent; a temperature effect that affects the acid dissociation equilibrium at the second or higher stage is utilized; and a temperature gradient including an superheated temperature region of 100° C. or higher is applied, not only a temperature gradient but also a pH gradient can thereby be applied by only using one eluent. Thereby, the number of types of eluents to be used can be reduced, and by only controlling separation conditions more simply, the amino acids in a sample can be separated with high precision. Further, the eluent to be used may be only one, and the parameter to be controlled in elution may be only a temperature condition, and therefore the analysis in the next time or later can be carried out quickly with good reproducibility by only returning the temperature of the separation column to the initial state, such as room temperature. That is, the method for amino acid analysis of the present invention, which is different from a conventional analysis method in which a plurality of eluents are used, does not have to perform equilibration over long hours in order to return the eluent in the separation column to the initial state.

Examples of the polybasic acid include: inorganic polybasic acids such as sulfuric acid ($H_2SO_4$), selenic acid ($H_2SeO_4$), phosphoric acid ($H_3PO_4$), and diphosphoric acid ($H_4P_2O_7$); and organic polybasic acids such as citric acid, sulfosalicylic acid, and fluorophthalic acid. Among others, it is preferable to use sulfuric acid because the second stage acid dissociation occurs in an acidic region, the amino acids in a sample can be separated with high precision, and sulfuric acid is inexpensive and easily available, and is excellent in versatility.

The pH of the eluent at room temperature (25° C.) is 5.0 or lower, preferably 4.5 or lower, more preferably 4.0 or less, and particularly preferably 3.5 or less. When the pH of the eluent is too high, the amino acids to be objects of analysis are not retained in the cation exchange resin to be eluted easily, so that the resolution is lowered. It is to be noted that the lower limit of the pH of the eluent is not particularly limited and may be 2.0 or higher. The pH of the eluent can appropriately be controlled by, for example, adjusting the concentration of the polybasic acid, or other methods.

The cation source is a component that dissociates in the eluent to produce a cation (excluding $H^+$). As the cation source, it is preferable to use an alkali metal salt. Examples of an alkali metal that constitutes the alkali metal salt include lithium (Li), sodium (Na), and potassium (K). Among others, lithium and sodium are preferable, and the alkali metal is more preferably sodium from the viewpoints such as being inexpensive and being easily available. It is to be noted that the retention times of amino acids change depending on the type of alkali metal ion. Therefore, the elution times of the amino acids to be objects of separation can appropriately be controlled by appropriately selecting the type of cation source to be used in the elution.

The content of the cation source in the eluent is not particularly limited. The content of the cation source in the eluent may be made such the concentration of the cation is, for example, 0.01 to 0.2 mol/L, and is preferably made such that the concentration of the cation is 0.02 to 0.1 mol/L.

Detection Step

In the detection step, the amino acids in a sample, which have been separated in the separation step, are detected. The detection of the amino acids may be carried out according to a conventionally known method. Examples of the method of detecting the amino acids include: (i) a method of performing UV detection utilizing the absorption of a carboxy group; (ii) a method of performing detection by visible absorbance after reaction with ninhydrin; and (iii) a method of performing fluorescence detection after reaction with o-phthalaldehyde. Among others, post-column derivatization methods, such as the methods of (ii) and (iii), are preferable because the methods enable the reactions to be automated and are excellent in quantitativity and reproducibility.

System for Amino Acid Analysis

FIG. 1 is a schematic diagram showing one embodiment of a system for amino acid analysis of the present invention. A system 100 for amino acid analysis of the embodiment shown in FIG. 1 is a system for use in the previously described method for amino acid analysis and includes: an eluent 2; a separation column 4; a heating mechanism, such as a column oven 6; a pressurization mechanism, such as a pump 8; and a detection unit, such as a detector 10.

The eluent 2 passes through a degasser 12, and is then pressurized with the pump 8 to be fed. A sample containing a plurality of amino acids is introduced in the system from an injector 14. The column oven 6 is a heating mechanism capable of heating the separation column 4 in such a way as to apply a temperature gradient including a temperature region of 100° C. or higher. The separation column 4 is heated with this column oven 6 by applying the temperature gradient including a temperature region of 100° C. or higher.

A preheater 16 is disposed on the upstream side of the separation column 4, the preheater 16 being capable of heating the eluent and sample to be introduced into the separation column. It is to be noted that a backpressure coil 20 is disposed on the downstream side of the separation column and can pressurize the eluent so as not to evaporate when the eluent, which is to be allowed to flow through the separation column 4, is heated to 100° C. or higher. The sample introduced into the system is introduced together with the eluent into the temperature-controlled preheater 16 and separation column 4 in due order. When the sample flows in the temperature-controlled separation column 4, a plurality of amino acids in the sample are thereby separated to be eluted out of the separation column 4 successively.

The amino acids, which have been eluted out of the separation column 4, are mixed with a reaction solution 22 containing a reaction reagent, such as ninhydrin or o-phthalaldehyde, the reaction solution 22 having been fed separately through a pump 18, and undergo reaction in a reaction coil 24, so that amino acid derivatives are produced. The produced amino acid derivatives eluted out of the reaction coil 24 to be introduced and identified in the detector 10.

By the method for amino acid analysis of the present invention, which is carried out using the above-described system for amino acid analysis, a plurality of amino acids in a sample can be separated and identified with high precision in a shorter time by using only one eluent without using a plurality of eluents, as described previously. Further, since the amino acids can be separated with high column efficiency, the amino acids can be analyzed with sufficient precision even if a smaller-sized separation column is used. Therefore, with respect to the system for amino acid analysis of the present invention, the scale (size) of the whole system is more compact as compared to a conventional analysis system. In addition, since the eluent which is prepared using relatively inexpensive, easily available components, such as a polybasic acid including sulfuric acid and the like, and a cation source including an alkali metal salt and the like, is used, the system for amino acid analysis of the present invention is highly versatile. Further, since a plurality of amino acids can be separated with high precision by only controlling the temperature condition (temperature gradient), the operation itself is simple, and the number of times of measurement in a certain time can greatly be increased.

Hereinafter, the present invention will be described specifically based on Examples, but the present invention is not limited to these Examples. It is to be noted that "parts" and "%" in Examples and Comparative Examples are each on a mass basis unless otherwise noted.

Separation Column

A strongly acidic cation exchange resin (trade name "MCI GEL CK10U", manufactured by Mitsubishi Chemical Corporation, degree of crosslinking: 10%, exchange capacity: 2.08 meq/mL, particle diameter: 5 μm) obtained by introducing a sulfo group in a styrene-divinylbenzene copolymer (PSDVB) was prepared. A stainless steel column was packed with the prepared strongly acidic cation exchange resin by a wet packing method to prepare a separation column.

Eluents

Eluent (1)

Sulfuric acid ($H_2SO_4$) and sodium sulfate ($Na_2SO_4$) were dissolved in water to prepare an eluent (1) having a cation ($Na^+$) concentration of 0.1 mol/L and having a pH of 3.0.

Eluent (2)

Hydrochloric acid (HCl) and sodium chloride (NaCl) were dissolved in water to prepare an eluent (2) having a cation ($Na^+$) concentration of 0.1 mol/L and having a pH of 3.0.

Amino Acid Analysis

EXAMPLE 1

A system for amino acid analysis of the same configuration as the configuration shown in FIG. 1 was configured using the prepared separation column and the prepared eluent (1). A sample containing 15 types of amino acids (aspartic acid (Asp), serine (Ser), glutamic acid (Glu), glycine (Gly), alanine (Ala), valine (Val), methionine (Met), leucine (Leu), isoleucine (Ile), tyrosine (Tyr), phenylalanine (Phe), tryptophan (Trp), histidine (His), lysine (Lys), and arginine (Arg)) was introduced into the system from an injector, and the amino acids were separated and analyzed using the separation column heated by applying a programmed temperature gradient in a temperature region from 40° C. to 200° C. The flow rate of the eluent (1) was set to 0.8 mL/min, and a stainless steel backpressure coil was provided between the separation column and the reaction coil to adjust the pressure in the separation column to about 10 to about 18 MPa. It is to be noted that a reaction solution containing o-phthalaldehyde was used, and the separated amino acids were detected by fluorescence detection utilizing a post-column reaction. FIG. 2 shows an obtained chromatogram.

Comparative Example 1

The amino acids were separated and analyzed in the same manner as in Example 1 described previously, except that the eluent (2) was used in place of the eluent (1). FIG. 3 shows an obtained chromatogram.

Reference Example 1

FIG. 4 shows a chromatogram that shows the result of amino acid analysis using a column (trade name "MCI GEL CK10U", degree of crosslinking: 10%, exchange capacity: 2.08 meq/mL, particle diameter: 5 μm, inner diameter of column: 6.0 mm×length: 120 mm) packed with a strongly acidic cation exchange resin obtained by introducing a sulfo group into a styrene-divinylbenzene copolymer (PSDVB), the chromatogram put on the home page of Mitsubishi Chemical Corporation (https://www.diaion.com/products/mcigel_05_ck03.html).

Evaluation

In FIGS. 2 and 3, the correspondence relation between respective peaks in the chromatograms and the amino acids is as follows.

1: Aspartic acid (Asp)
2: Serine (Ser)
3: Glutamic acid (Glu)
4: Glycine (Gly)
5: Alanine (Ala)
6: Valine (Val)
7: Methionine (Met)
8: Leucine (Leu)
9: Isoleucine (Ile)

10: Tyrosine (Tyr)
11: Phenylalanine (Phe)
12: Tryptophan (Trp)
13: Histidine (His)
14: Lysine (Lys)
15: Arginine (Arg)

As shown in FIG. 2, in the case where the separation column heated by applying a programmed temperature gradient in a temperature region from 40° C. to 200° C. was used with the eluent (1) containing sulfuric acid and sodium sulfate as a mobile phase, it was found that 15 types of amino acids can be separated in about 55 minutes. In contrast, as shown in FIG. 3, in the case where hydrochloric acid and sodium hydrochloride was used as a mobile phase, histidine, lysine, and arginine were not eluted even if the temperature gradient which was the same as the temperature gradient in Example 1 was applied.

As shown in FIG. 4, it is found that 17 types of amino acids can be separated in a time equal to the time in Example 1 even if the temperature gradient including a temperature region of 100° C. or higher is not applied. However, the lowest theoretical plate height calculated from the peak width and retention time from each chromatogram is about 2.67 μm (Lysine) in FIG. 4, but is about 0.53 μm (tryptophan) in FIG. 2, and thus, FIG. 2 shows the plate height value about one fifth of the value in FIG. 4. That is, it is found that in Example 1 where separation was performed applying a programmed temperature gradient including a temperature region of 100° C. or higher, the separation performance is remarkably improved as compared to Reference Example 1 where separation was performed without applying a temperature gradient.

In addition, the followings are clear: (i) a plurality of (four) eluents need to be used in Reference Example 1, but in contrast, using one eluent is sufficient in Example 1; and (ii) the separation column needs to be equilibrated over long hours before the next measurement in Reference Example 1, but in contrast, the next measurement can immediately be started in Example 1 because the temperature of the column has only to be lowered.

The method for amino acid analysis of the present invention enables separation and analysis of amino acids in a sample with high precision in a shorter time and is highly versatile, and therefore the method for amino acid analysis of the present invention is useful as, for example, an analysis method for inspecting and developing foods or pharmaceuticals in addition to diagnosis of diseases.

2: Eluent
4: Separation column
6: Column oven
8, 18: Pump
10: Detector
12: Degasser
14: Injector
16: Preheater
20: Backpressure coil
22: Reaction solution
24: Reaction coil
100: System for amino acid analysis

What is claimed is:

1. A method for separating a basic amino acid from a non-basic amino acid in a mixture of a plurality of amino acids comprising the basic amino acid and the non-basic amino acid, the method comprising:

passing a sample comprising the mixture of the plurality of amino acids together with an eluent, through a separation column packed with a cation exchange resin, thereby the basic amino acid and the non-basic amino acid being eluted separately; and detecting each of the separately eluted amino acids, wherein the eluent is only one eluent and has a composition comprising: a polybasic acid, a cation source, and water, and the eluent has a pH in a range of 5.0 or lower at a temperature of 25° C., the composition of the eluent is a same composition throughout the separating of the amino acids by the passing, the cation source is at least one salt of an alkali metal selected from the group consisting of a lithium (Li) salt and a sodium (Na) salt, and the sample flows through the separation column that is heated by applying a temperature gradient including a temperature region of 100° C. or higher.

2. The method for separating a basic amino acid according to claim 1, wherein the polybasic acid is at least one acid selected from the group consisting of sulfuric acid, selenic acid, phosphoric acid, diphosphoric acid, citric acid, sulfosalicylic acid, and fluorophthalic acid.

3. The method for separating a basic amino acid according to claim 1, wherein a highest temperature in the temperature gradient is 210° C.

4. The method for separating a basic amino acid according to claim 1, wherein the cation exchange resin is a strongly acidic cation exchange resin having a sulfo group.

5. The method for separating a basic amino acid according to claim 1, wherein the basic amino acid comprises a plurality of basic amino acids, and the method separates the plurality of basic amino acids from each other.

6. A system for separating a basic amino acid from a non-basic amino acid in a mixture of a plurality of amino acids comprising the basic amino acid and the non-basic amino acid, the system comprising:

an eluent having a composition that comprises: a polybasic acid, a cation source, and water, having a pH in a range of 5.0 or lower at a temperature of 25° C., and being only one eluent present in the system and having a same composition therein;

a separation column packed with a cation exchange resin and configured so that a sample comprising the mixture of the plurality of amino acids passes through the separation column with the eluent, thereby the basic amino acid and the non-basic amino acid being eluted separately;

a heater configured to heat the separation column by applying a temperature gradient including a temperature region of 100° C. or higher;

a pressurizer configured to flow the sample together with the eluent through the separation column by adding pressure to the separation column; and a detector configured to detect each of the separately eluted amino acids from the separation column, wherein the cation source is at least one salt of an alkali metal selected from the group consisting of a lithium (Li) salt and a sodium (Na) salt.

* * * * *